United States Patent [19]
Horton et al.

[11] 3,861,162
[45] Jan. 21, 1975

[54] COOLING SYSTEM AND HEAT TRANSFER ASSEMBLY

[75] Inventors: Lawrence R. Horton, Tarzana; G. Val Mumford, Los Angeles; Charles A. Jackson, Thousand Oaks; William P. Holcomb, Westlake Village; Catherine Horton, Tarzana; Charles Willison, Diamond Bar, all of Calif.

[73] Assignee: Refrigerated Sea Water, Inc., Sherman Oaks, Calif.

[22] Filed: Mar. 16, 1973

[21] Appl. No.: 342,143

[52] U.S. Cl................... 62/243, 62/64, 62/240, 165/154
[51] Int. Cl.............................................. B60h 3/04
[58] Field of Search .......... 165/131, 154, 164, 156, 165/180; 62/64, 240, 243

[56] References Cited
UNITED STATES PATENTS

| | | | |
|---|---|---|---|
| 1,887,463 | 11/1932 | Ogura | 62/240 |
| 2,276,400 | 3/1942 | Hubbard | 165/122 |
| 2,692,763 | 10/1954 | Holm | 165/154 |
| 2,746,272 | 5/1956 | Carpenter | 62/240 |
| 2,751,882 | 6/1956 | Coyner | 62/64 |
| 2,756,032 | 7/1956 | Dowell | 165/156 |
| 3,197,975 | 8/1965 | Bobing | 165/154 |
| 3,235,003 | 2/1966 | Smith | 165/154 |
| 3,435,893 | 4/1969 | Withers | 165/180 |
| 3,438,430 | 4/1969 | Kestemont | 165/154 |

FOREIGN PATENTS OR APPLICATIONS

| | | | |
|---|---|---|---|
| 1,061,940 | 7/1959 | Germany | 165/154 |

*Primary Examiner*—William J. Wye
*Attorney, Agent, or Firm*—John J. Posta, Jr.

[57] ABSTRACT

The improved engine powered portable product cooling system of the invention includes a compressor assembly and a separate evaporator assembly, each of which employs a novel heat transfer coil assembly in the form of a central hollow core and a hollow tube spaced outwardly therefrom by spacer means in the form of a plurality of spaced projections. Preferably, the outer tube comprises a plurality of sections releasably secured together so that cleaning of the assembly can easily be accomplished.

The product cooling system also includes product holding means which may comprise a plurality of interconnected stacked trays for sequential cooling, and is particularly adapted for use with sea water. Sea water can be used to carry heat from a core refrigerant in the condenser while a separate colume of sea water can be cooled in the evaporator for subsequent direct application to the product to be cooled.

8 Claims, 2 Drawing Figures

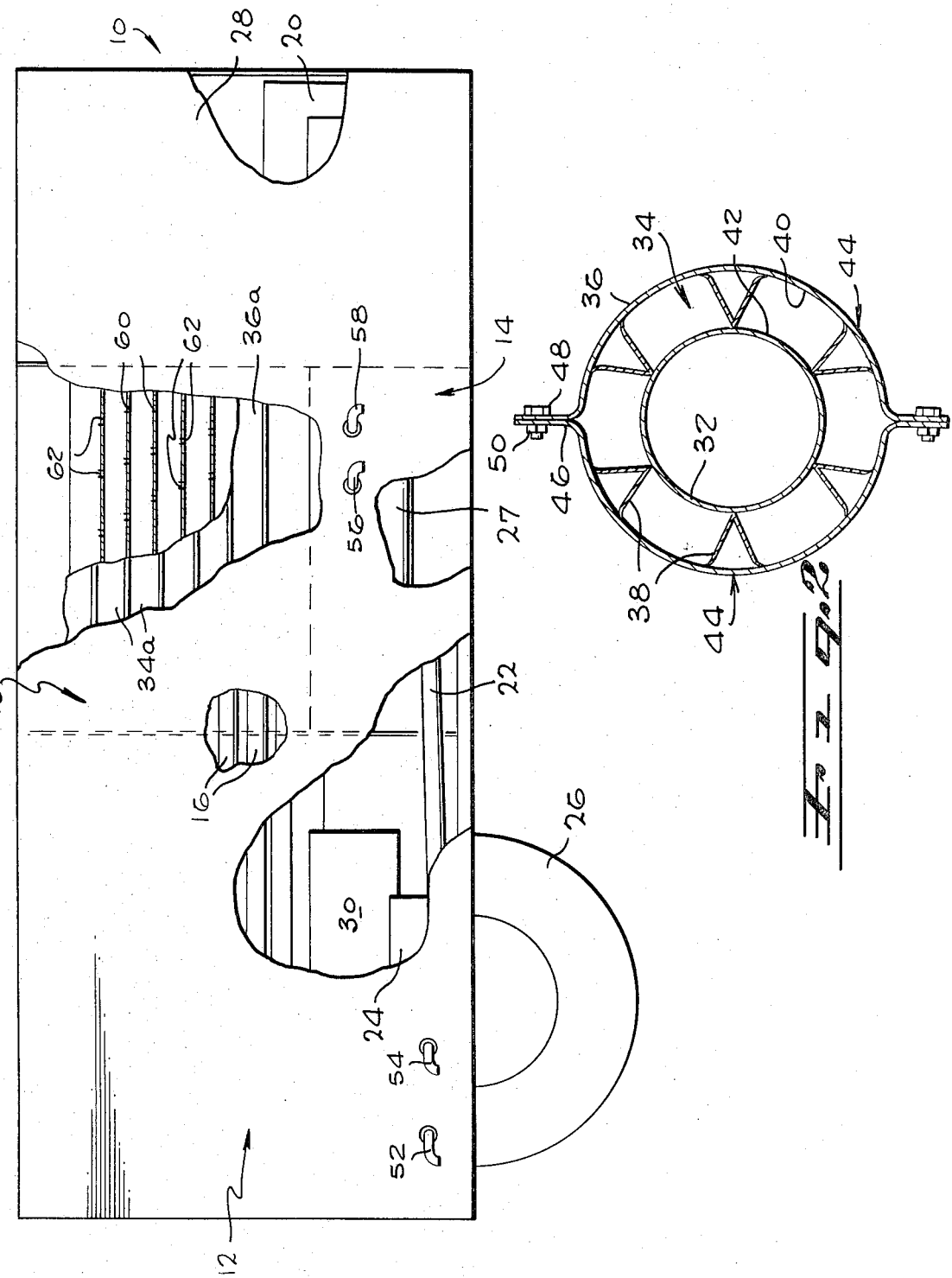

COOLING SYSTEM AND HEAT TRANSFER ASSEMBLY

BACKGROUND OF THE INVENTION

1. Field of the Invention

The present invention generally relates to cooling systems and more particularly to portable engine powered cooling systems featuring direct application of coolant to a product.

2. Description of Prior Art

Conventional types of systems for the cooling of products such as fresh fish and the like depend either on ice or on refrigeration by electric power. Most systems are not mobile and are relatively expensive to manufacture and operate. Moreover, they usually are not adapted for use in a variety of applications and environments.

Accordingly, there is a need for an inexpensive portable system for rapidly cooling large quantities of fish and other products, particularly on location, i.e., on shipboard, on the beach and in remote areas where electricity and/or ice are unavailable or are too expensive to be practical. Such system should be highly mobile, have large capacity, operate with conventional, easily available fuels and, preferably, be capable of employing sea water or other readily available medium as coolant. Moreover, such system should be easily cleanable and repairable, since contamination of product must be avoided.

SUMMARY OF THE INVENTION

The present invention satisfies the foregoing needs. It is substantially as set forth in the Abstract above. It not only is portable and inexpensive to manufacture and to operate, but is highly mobile, adaptable for use with fresh or sea water and can rapidly and continuously cool a large quantity of product. It can be easily repaired, cleaned and maintained and is powered by conventional engine fuel, such as gasoline, diesel oil or the like. It can be built into an existing powered vehicle such as a motor bus, camper-type vehicle, truck or the like, or can be easily incorporated into a trailer, with self-contained power or a power take-off. Various other features of the system are set forth hereinafter.

It is also part of the present invention to provide an improved heat transfer coil assembly, which can be incorporated in the present cooling system. The improved coil assembly features, in part, turbulence-creating means disposed between inner and outer coils to improve heat transfer, and a split outer coil configuration to facilitate cleaning and repair.

BRIEF DESCRIPTION OF THE DRAWINGS

FIG. 1 of the drawings depicts schematically in side elevation a preferred embodiment of the improved cooling system of the invention, with portions being broken away to illustrate internal features thereof; and, FIG. 2 schematically depicts an enlarged cross-section of a preferred embodiment of the heat transfer coil assembly of the invention.

DESCRIPTION OF THE PREFERRED EMBODIMENT

As shown schematically in side elevation in FIG. 1, the improved cooling system 10 of the present invention includes a rear compressor assembly 12, a front evaporator assembly 14, transfer means in the form of tubes 16 interconnecting assemblies 12 and 14, product holding means 18, engine means 20 connected through a drive or crane shaft 22, a power take-off 24 to compressor assembly 12 and to wheel(s) 26 through shaft 22 and a differential (not shown). Engine means 20 may also be connected to pump means 27 of evaporator assembly 14. The described components are housed within a container means in the form of a vehicle body and frame 28.

Compressor assembly 12 includes pump means 30 connected to power take-off 24 which may be, for example, incorporated in a two-groove sheave (not shown) secured to shaft 22. Pump means 30 is, in turn, connected to a hollow core 32 (FIG. 2) disposed in a heat transfer coil assembly 34 which also includes an outer hollow tube 36 disposed around and spaced from core 32 by spacer means in the form of a plurality of spaced projections 38.

Projections 38 may be, for example, integral with the inner surface 40 of tube 36 and abut the outer surface 42 of core 32. Alternatively, projections 38 can be separate from core 32 and tube 36 or integral with core 32. They serve to create turbulence in fluid passing between surface 40 and surface 42 within tube 36 for better heat transfer between core 32 and tube 36. Projections 38 spaced around the periphery of core 32 can also be spaced longitudinally of the coil assembly.

A conventional refrigerant such as dichlorofluoromethane, or the like, is disposed within core 32 and water, preferably sea water, is disposed within tube 36. Core 32 can be fabricated of any suitable material which is a good heat transfer material, for example, metal, such as aluminum, copper or the like, thin plastic resistant to the refrigerant, or other material. Tube 36 can also be any suitable material such as metal, the same as or different than core 32 or can be a plastic, such as polyethylene, polypropylene, polystyrene, polyvinyl chloride or other suitable plastic resistant to salt water corrosion. Such plastic need not be and preferably is not a good heat transfer medium.

Preferably, tube 36 is split longitudinally into a plurality of longitudinal sections 44 (such as the two shown in FIG. 2) releasably secured together at outwardly extending wing portions 46 thereof by securing means such as threaded bolts 48, and nuts 50. With such a construction, tube 36 can be easily secured around core 32 and can be as easily removed for inspection, cleaning and repair of core 32 and tube 36.

Pump means 30 includes one or more pumps which perform conventional functions of compressing refrigerant and pumping the same through core 32 in compressor assembly 12. A pump is also provided as part of pump means 30 for circulating water through tube 36 in compressor assembly 12, and for passing water into tube 36 through an inlet 52 in container wall 28 and passing water from tube 36 through an outlet 54, in walls 28. Water is used in tube 36 to extract heat from refrigerant in core 32, during the compression effected in assembly 12 and in the heated state passed from assembly 12 to waste. Alternatively, it can be used to clean equipment or the like. Components of compressor assembly 12 other than coil assembly 34 can be fabricated of conventional materials in accordance with well known practice.

The cooled refrigerant exits compressor assembly 12 through transfer tube 16 and passes into the core of a coil assembly 34a identical to that of assembly 34. Assembly 34a is disposed within evaporator assembly 14 which also includes pump means 27 and a water inlet 56 and outlet 58 connected to tube 36a of assembly 34a. Thus, water is pumped into coil assembly 34a and is cooled therein by heat transfer with refrigerant in the core therein. Means can also be provided in assembly 14 in order to cool the water to the desired degree.

Sea water can be recirculated until it is cooled to about 30° fahrenheit or even below, for example 23° f., if supplemented with salt to form a brine solution.

The cooled water is then passed from assembly 14 into product holding compartment 18 where it is used to directly cool the product. Compartment 18 may comprise a cascade arrangement in the form of a plurality of stacked trays 60 provided with openings 62 to permit water to pass up from tray 60 to tray 60, cooling each product level in turn. Since water cooled in evaporator assembly 14 can continuously flow into contact with the product in compartment 18, continuous washing of the product can occur. This strips the product of bacteria which are then removed from the system with the water as waste, thus retarding bacterial growth external to the product and greatly minimizing contamination. This is in contrast to systems recycling water or other coolant after its initial contact with product.

Refrigerant in the core of assembly 34a is, after cooling water in tube 36a, returned to compressor assembly 12 through a transfer tube 16 or the like for recompression and heat extraction, in order to continue the described cycle.

Evaporator assembly 14 can include conventional components, other than the described unique coil assembly 34a and cascade arrangement of trays 60, as can engine 20, wheels 26 and housing 28. Moreover, system 10 can be part of a powered vehicle, as shown in FIG. 1, or of a trailer with a self-contained powering engine 20 or with a power take-off from an associated vehicle or the like (not shown).

System 10 permits the use of fresh water, sea water and brine as a direct cooling medium while maintaining a conventional refrigerant in a separate heat transfer cycle within a set of cores. The water is introduced into the system in two separate connected cycles. Water in one cycle is utilized to transfer heat from the refrigerant in the compressor assembly. In the other cycle water is cooled in the evaporator assembly and then is used as a direct cooling medium. The novel heat transfer coil assemblies employed in system 10 assure easy access to the refrigerant cores and water tubes for easy and rapid assembly, dissembly, maintenance and repair.

The present system is compact, inexpensive, highly efficient and rapid in use. It is also durable, can cool large quantities of water and needs no electrical power. Most important, it is mobile and highly adaptable to a variety of uses. Other advantages are as set forth in the foregoing.

Various modifications, changes and additions can be made in the present cooling system, its components and parameters and in the present heat transfer coil assembly, the components and parameters. All such modifications, changes and additions as are within the scope of the appended claims form part of the present invention.

What is claimed and desired to be secured by Letters Patent is:

1. An improved engine powered portable product cooling system, comprising, in combination:
   A. A compressor assembly, including:
      1. a compressor coil sub-assembly comprising:
         a. a first hollow core containing refrigerant to be condensed,
         b. a first outer hollow tube spaced from and surrounding said first core and containing water,
         c. spacer means between said first core and first tube for creating turbulence in said first tube water;
      2. pump means for compressing said refrigerant and circulating said refrigerant through said first core and said water through said first tube; and
      3. first inlet and outlet means connected to said first tube;
   B. An evaporator assembly, including:
      1. an evaporator coil sub-assembly comprising:
         a. a second hollow core containing cooled condensed refrigerant,
         b. a second outer hollow tube spaced from and surrounding said second core and containing water to be cooled,
         c. spacer means between said second core and second tube for creating turbulence in said second tube water;
      2. pump means for circulating said refrigerant through said second core and water through said second tube; and
      3. second inlet and outlet means connected to said second tube;
   C. Transfer means interconnecting said first and second cores for circulation of said refrigerant between said compressor and said evaporator;
   D. Product holding means connected with said second outlet means for contacting product with cooled tube water;
   E. Engine motive means for powering said pump means;
   F. Container means enclosing said system; and
   G. Means for moving said system.

2. The improved system of claim 1 wherein said water comprises sea water.

3. The improved system of claim 1 wherein said product holding means includes a plurality of stacked interconnected trays for sequential cascade product cooling.

4. The improved system of claim 1 wherein said system includes means for recirculating said water in said second tube before passage to said product holding means.

5. The improved system of claim 1 wherein said container means comprises a wheeled vehicle and said engine is a fuel powered engine.

6. The improved system of claim 5 wherein said vehicle is a self-powered fuel driven vehicle.

7. The improved system of claim 5 wherein said vehicle comprises a trailer.

8. The improved system of claim 1 wherein said first and second tubes each comprise mating sections releasably secured together, wherein said spacer means comprise projections extending inwardly from the inner surface of said sections and spaced along the periphery thereof.

* * * * *